United States Patent [19]

Hsiao

[11] Patent Number: 5,444,999
[45] Date of Patent: Aug. 29, 1995

[54] GEAR SHIFT LEVER LOCK

[76] Inventor: Yung-Chi Hsiao, No. 19-1, Lane 245, Hsi Sheng Street, Hsin Chuang City, Taipei Hsien, Taiwan

[21] Appl. No.: 300,338

[22] Filed: Sep. 2, 1994

[51] Int. Cl.$^6$ ............................................. B60R 25/06
[52] U.S. Cl. ......................................... 70/247; 70/48; 70/202
[58] Field of Search .................. 70/40, 48, 59, 62, 196, 70/198–203, 237, 245–248, 251, 454; 180/287

[56] References Cited

U.S. PATENT DOCUMENTS

| | | | |
|---|---|---|---|
| 438,526 | 10/1890 | Butler | 70/40 |
| 1,150,999 | 8/1915 | Corley | 70/40 |
| 2,647,390 | 8/1953 | Paulson | 70/40 |
| 4,104,898 | 8/1978 | Fois | 70/454 X |
| 5,311,756 | 5/1994 | Villani | 70/247 |

Primary Examiner—Lloyd A. Gall
Attorney, Agent, or Firm—Varndell Legal Group

[57] ABSTRACT

A gear shift lever lock including a lock body fixedly fastened to the console of a car near the gear shift lever and defining a circularly arched constraint chamber, a top cover covered on the lock body at the top, a shackle made to slide in and out of a sliding way on the lock body, a shackle spring mounted within a groove on the lock body to keep the shackle in the unlocking position, a latch bolt supported on a spring within a locating groove on the lock body, and a lock cylinder mounted within a locating hole on the top cover and a recessed hole on the lock body, and wherein pulling the shackle out of the sliding way causes the latch bolt to lock the shackle in the locking position in holding down the gear shift lever within the constraint chamber; turning the cylinder lock with the key causes the latch bolt to be released from the shackle to unlock the gear shift lever.

1 Claim, 7 Drawing Sheets

GEAR SHIFT LEVER LOCK

BACKGROUND OF THE INVENTION

The present invention relates to a gear shift lever lock fixedly fastened to the console of a car for locking the gear shift lever.

Various steering locks have been disclosed for locking the steering wheels or gear shift levers of motor vehicles. These lock devices cannot be moved to the locking position without using the key. Therefore, the car drivers may have little desire to lock the lock during a temporary parking.

The present invention has been accomplished to provide a gear shift lever lock which can be conveniently moved to the locking position without using the key. According to the preferred embodiment of the present invention, the gear shift lever lock comprises a lock body fixedly fastened to the console of a car near the gear shift lever and defining a circularly arched constraint chamber, a top cover covered on the lock body at the top, a shackle made to slide in and out of a sliding way on the lock body, a shackle spring mounted within a groove on the lock body to keep the shackle in the un locking position, a latch bolt supported on a spring within a locating groove on the lock body, and a lock cylinder mounted within a locating hole on the top cover and a recessed hole on the lock body, and wherein pulling the shackle out of the sliding way causes the latch bolt to lock the shackle in the locking position in holding down the gear shift lever within the constraint chamber; turning the cylinder lock with the key causes the latch bolt to be released from the shackle to unlock the gear shift lever.

DETAILED DESCRIPTION OF THE PREFERRED EMBODIMENT

Figure 1:
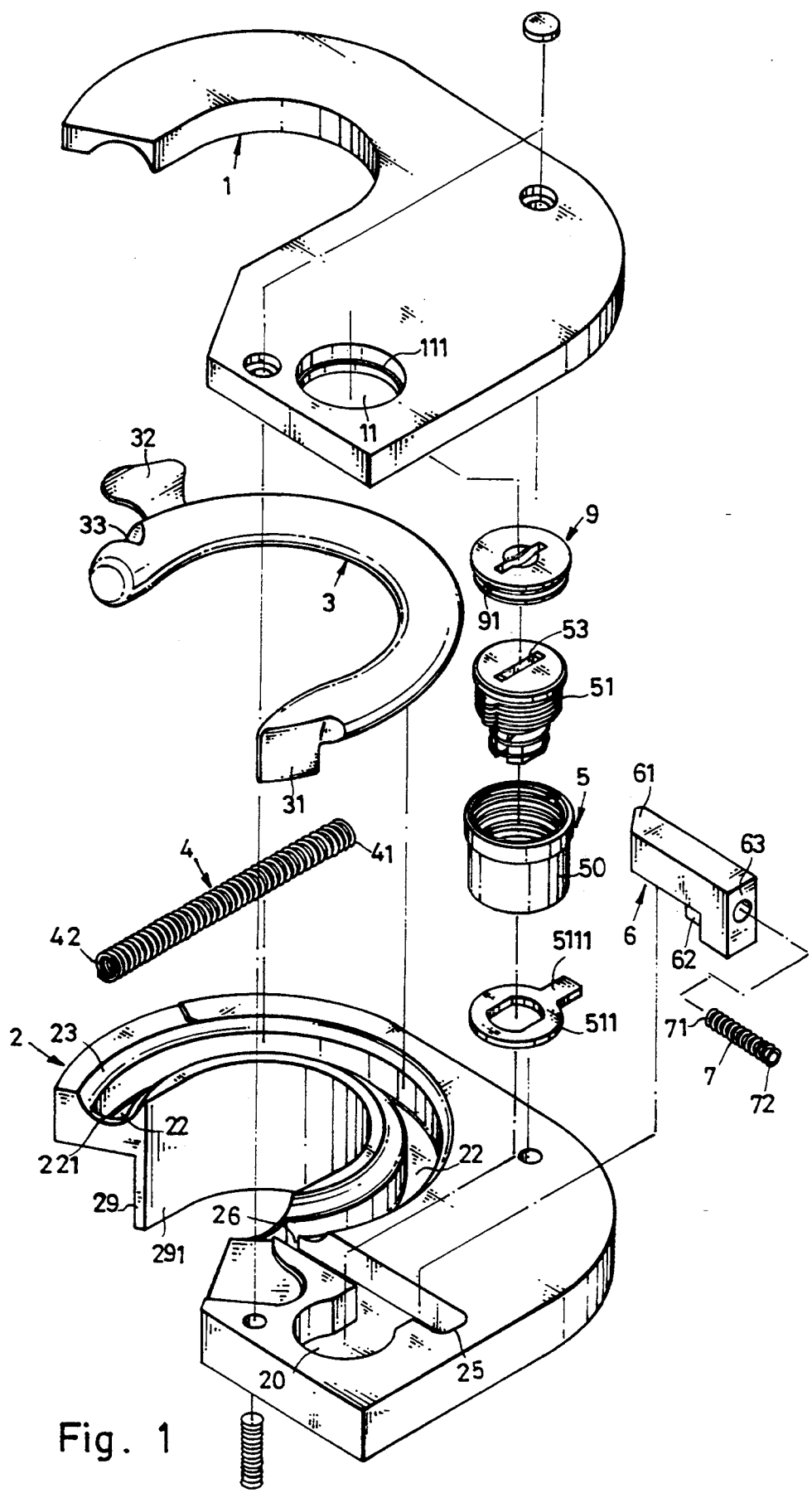
FIG. 1 is an exploded view of a gear shift lever lock according to the present invention
Figure 2:
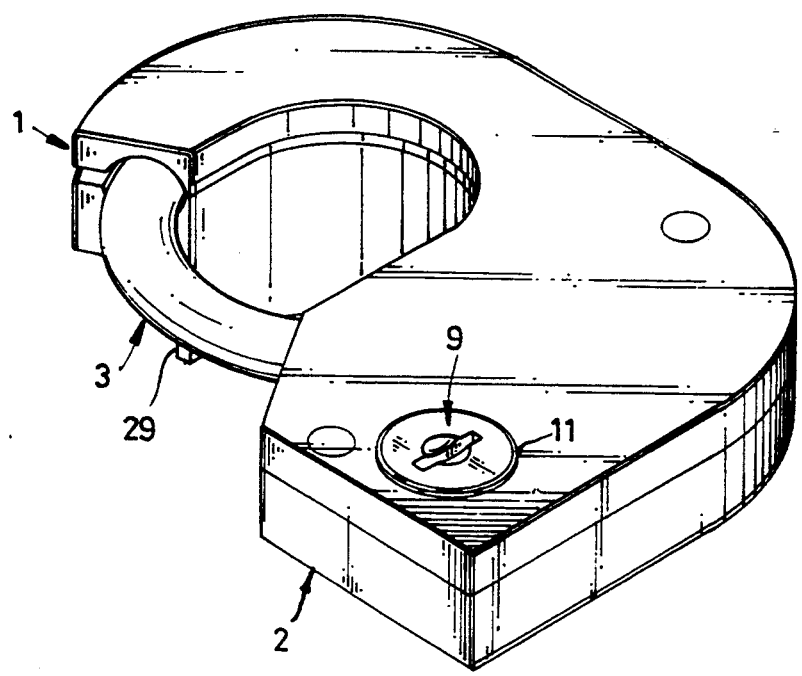
FIG. 2 is an elevational view of the gear shift lever lock shown in FIG. 1.

Referring to the annexed drawings in detail, a gear shift lever lock in accordance with the present invention is generally comprised of a top cover shell 1, a lock body 2, a shackle 3, a shackle spring 4, a cylinder lock 5, a latch bolt 6, and a latch spring 7.

The top cover shell 1 is fixedly fastened to the lock body 2 at the top, having a locating hole 11, which receives the cylinder lock 5, and an annular groove 111 within the locating hole 11. The lock body 2 is made of flat shape and fixedly fastened to the console of a car near the gear shift lever 8 (see FIG. 3), comprising a half-round flange 29 vertically downwards extended from the bottom wall thereof, which has an inside wall 291, when the gear shift lever lock is installed, surrounding the gear shift lever 8 to protect the lever body 81 of the gear shift lever 8 from being cut by a saw or cutting means, a groove 22, which receives the shackle spring 4, a circularly arched sliding way 23 disposed above the second groove 22, through which the shackle 3 is moved in and out, a recessed hole 20, which receives the cylindrical casing 50 of the cylinder lock 5, and a locating groove 26, which extends from one end of the second groove 22 and receives the latch bolt 6. The shackle 3 is made to slide in and out of the sliding way 23, having a stop block 31 at one end stopped against one end 41 of the shackle spring 4, a notch 33 at an opposite end, and a handle 32 near the notch 33. The shackle spring 4 is received in the groove 22, having one end 41 fastened to the stop block 31 of the shackle 3 and an opposite end 42 stopped against an end wall 221 on the groove 22. The cylinder lock 5 comprises a cylindrical casing 50 mounted within the locating hole 11 and received within the recessed hole 20, a lock cylinder 51 received within the cylindrical casing 50 and having key way 53 disposed at the top, a driving plate 511 received within the recessed hole 20 and coupled to the lock cylinder 51 at the bottom end having a driving rod 5111 inserted into a hole 62 on the latch bolt 6, and a protective cap 9 mounted within the locating hole 11 above the lock cylinder 51 and having two opposite stub pins 91 respectively inserted into the annular groove 111 within the locating hole 11. Because the two stub pins 91 of the protective cap 9 are inserted into the annular groove 111, the protective cap 9 will be turned within the locating hole 11 when the thief tries to insert a lever. The latch bolt 6 is received in the locating groove 26, having a beveled front end 61 moved to lock in the notch 33 on the front end of the shackle 3, a rear end 63 stopped against one end 71 of the latch spring 7, and a hole 62 at one side, which receives the driving rod 5111 of the cylinder lock 5. The latch spring 7 is received in the locating groove 26, having one end 71 stopped aginst the rear end 63 of the latch bolt 6 and an opposite end 72 stopped against an end wall 25 of the locating groove 26.

Figure 3:
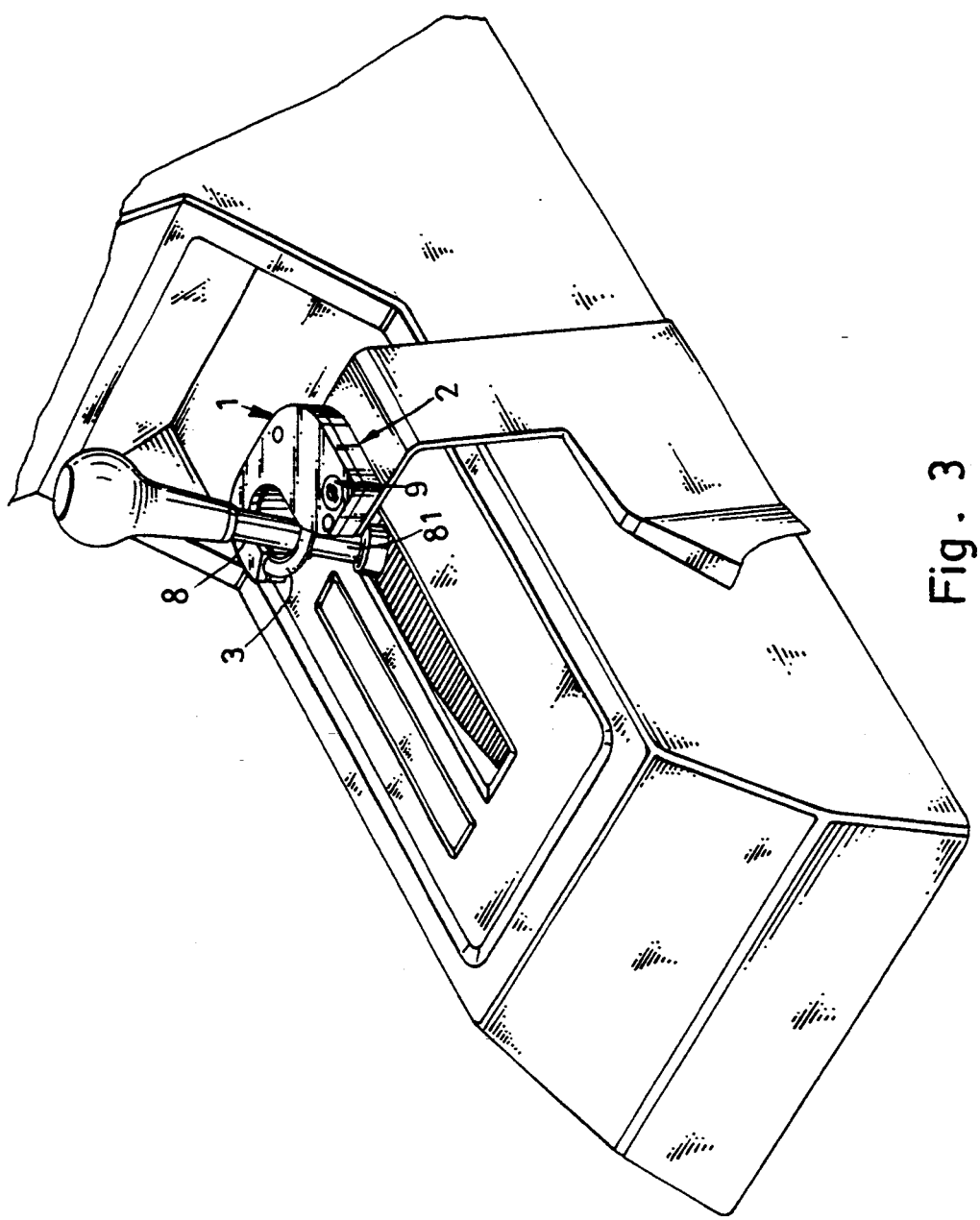
FIG. 3 is an installed view showing the gear shift lever lock of the present invention installed in the console of a car and locked.
Figure 4:
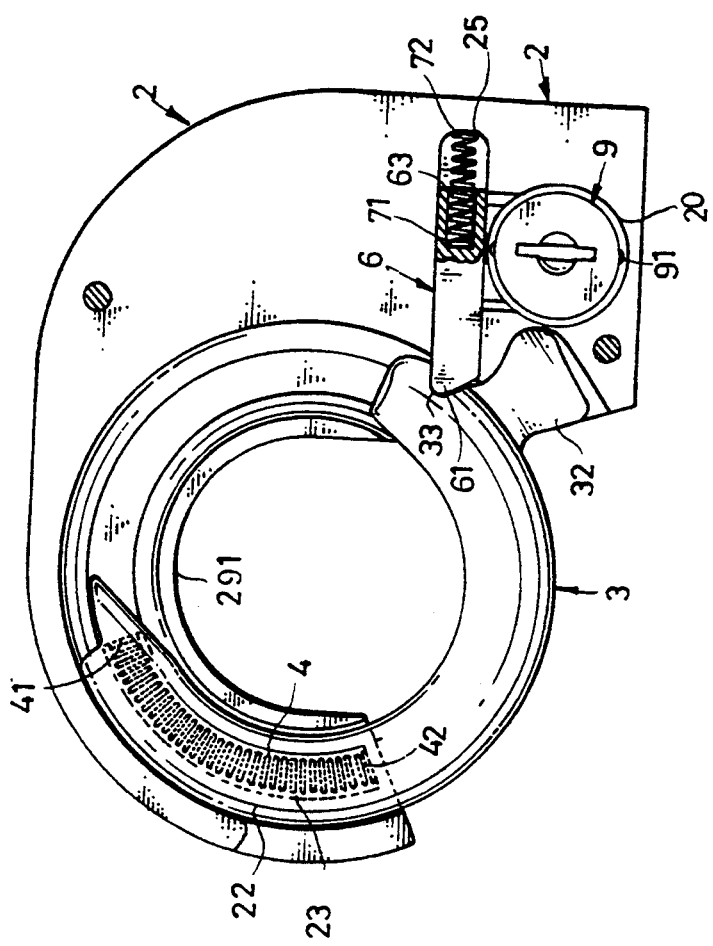
FIG. 4 is a plan view of the gear shift lever lock shown in FIG. 2, when locked (top cover shell removed).
Figure 5:
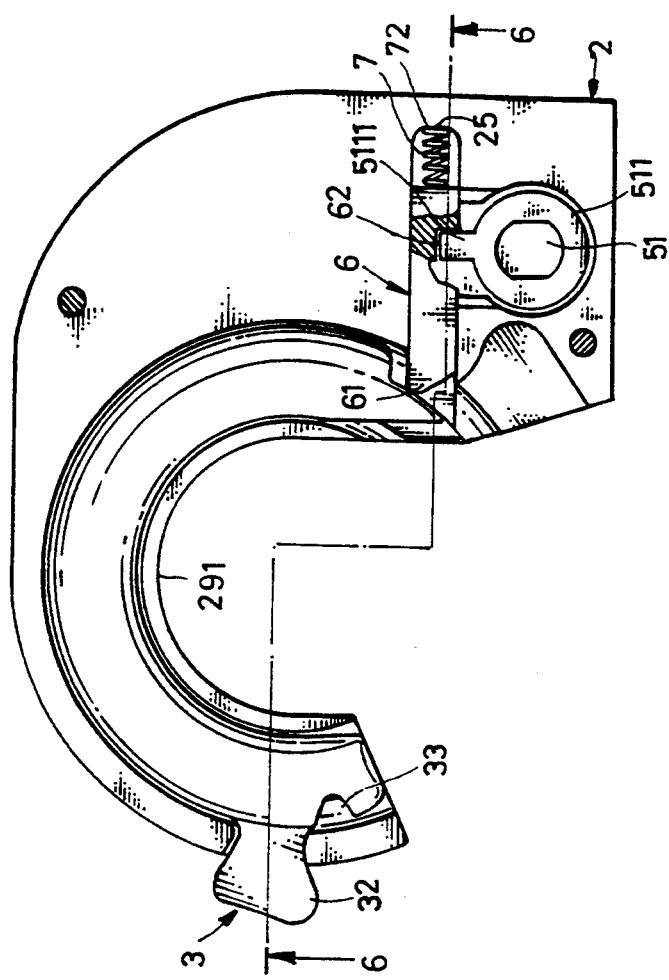
FIG. 5 is a plan view of the gear shift lever lock shown in FIG. 2, when unlocked (top cover shell removed).
Figure 6:
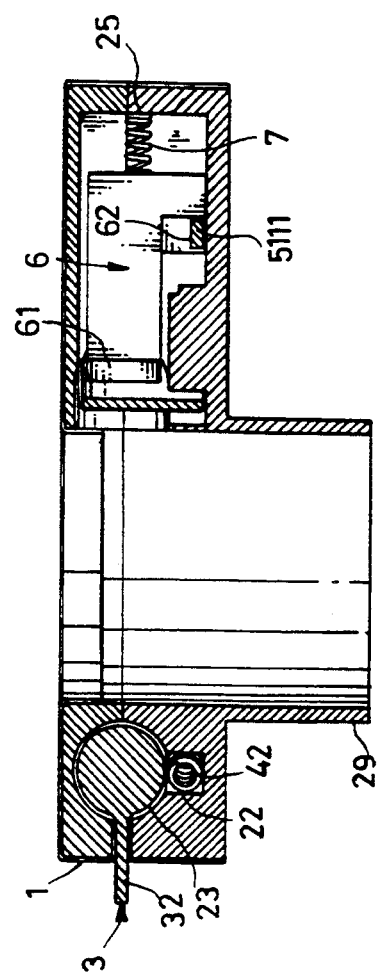
FIG. 6 is a sectional view taken on line 6—6 of FIG. 5.
Figure 7:
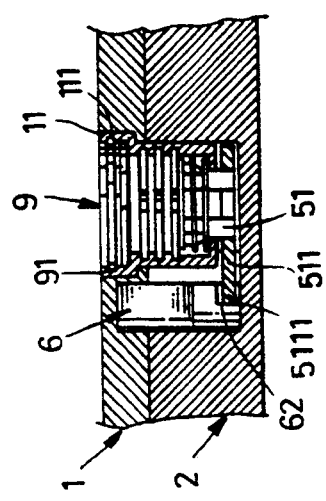
FIG. 7 is a partial view in section of the gear shift lever lock of FIG. 2, showing the arrangement of the cylinder lock and the latch bolt.
Figure 8:
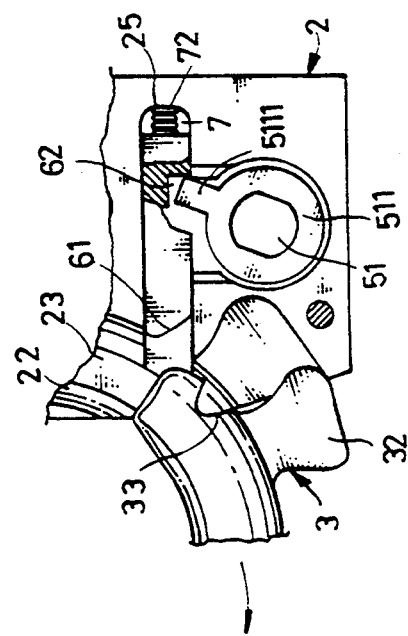
FIG. 8 is a top view in plan of FIG. 7.

Referring to FIG. 3, when the gear shift lever lock is installed in the console of a car, it can lock the gear shift lever 8 of the car in position. The operation of the gear shift lever lock is outlined hereinafter. By means of the handle 32, the shackle 3 is pulled out of the front end (at the end wall 221) of the sliding way 23 to the rear end (at the locating groove 26) thereof. When the front end of the shackle 3 is moved to the rear end of the sliding way 23, the beveled front end 61 of the latch bolt 6 is forced into the notch 33 causing the shackle 3 to be locked (see FIG. 4). When locked, the shackle spring 4 is compressed. To unlock the lock, the key (not shown) is inserted through the key way on the protective cap and the key way 53 on the lock cylinder 51 and turned to drive the driving plate 511 in moving the latch bolt 6 backwards (see FIG. 8). When the latch bolt 6 is moved backwards, the beveled front end 61 of the latch bolt 6 is released from the notch 33 of the shackle 3, and therefore the shackle spring 4 automatically pushes the shackle 3 back inside the sliding way 23 (see FIGS. 5 and 6).

I claim:

1. A gear shift lever lock comprising:

a lock body fixedly fastened to the console of a car near a gear shift lever, said lock body comprising a half-round flange vertically downwards extended from a bottom wall thereof and defining a constraint chamber, a groove at the top, a circularly arched sliding way above said groove, a recessed hole, a locating groove communicated between said groove and said recessed hole;

a top cover shell covered on said lock body at the top, having a locating hole vertically aligned with said recessed hole of said lock body, and an annular groove within said locating hole;

a shackle made to slide in and out of said sliding way, having a front end made with a side notch and a side handle and a rear end terminating in a stop block;

a shackle spring received in said groove, having one end fastened to the stop block of said shackle and an opposite end stopped against an end wall at a front end of said groove;

a cylinder lock mounted within the locating hole on said top cover and the recessed hole on said lock body, said cylinder lock comprising a cylindrical casing mounted within the locating hole of said top cover and received within the recessed hole of said lock body, a lock cylinder received within said cylindrical casing and having a key way disposed at the top, a driving plate received within the recessed hole of said lock body and coupled to said lock cylinder at the bottom and having a driving red, and a protective cap mounted within the locating hole of said top cover and disposed above said lock cylinder and having two opposite stub pins respectively inserted into the annular groove within the locating hole of said top cover;

a latch bolt received in the locating groove, having a beveled front end moved to engage the notch on said shackle, a rear end supported on a spring being fastened inside the locating groove of said lock body; and wherein pulling said shackle out of said sliding way causes the beveled front end of said latch bolt to engage the notch on said shackle permitting the gear shift lever of the car to be locked in said constraint chamber; turning the lock cylinder of said cylinder lock backwards with a key causes said latch bolt to be moved backwards from the notch of said shackle by the driving rod of said driving plate to unlock the gear shift lever.

* * * * *